(No Model.) 3 Sheets—Sheet 1.
W. BUCKLEY.
SPRING.
No. 274,715. Patented Mar. 27, 1883.
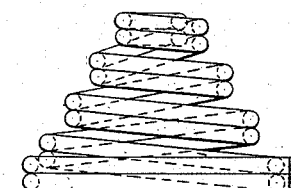
Fig: 1
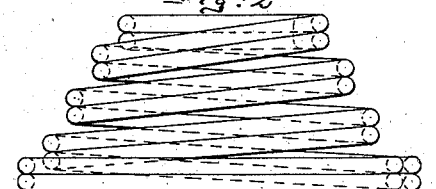
Fig: 2
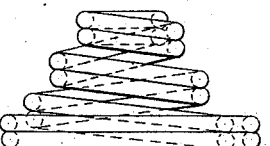
Fig: 3
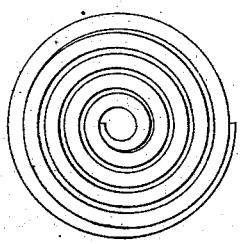
Fig: 4
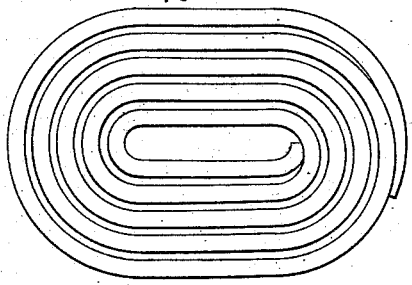
Fig: 5
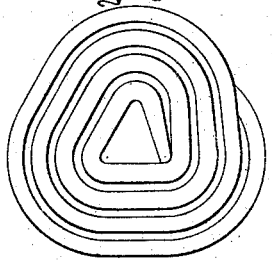
Fig: 6
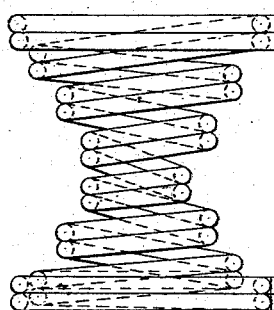
Fig: 7
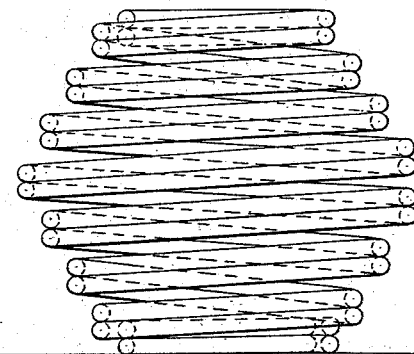
Fig: 8
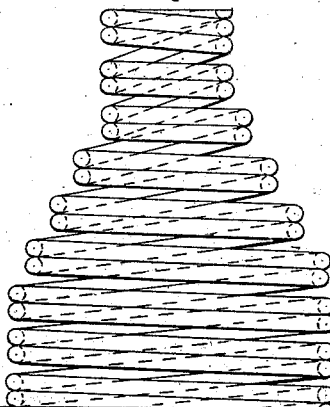
Fig: 9
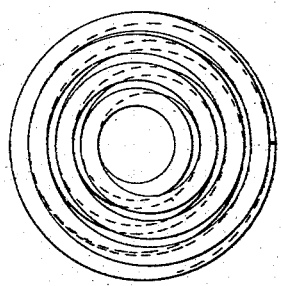
Fig: 10
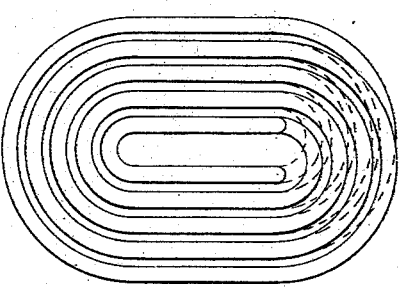
Fig: 11
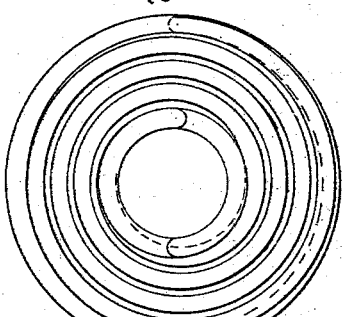
Fig: 12
Witnesses:
John E. Tunbridge,
John M. Speer.
Inventor:
William Buckley
by his attorneys
Briesen & Betts

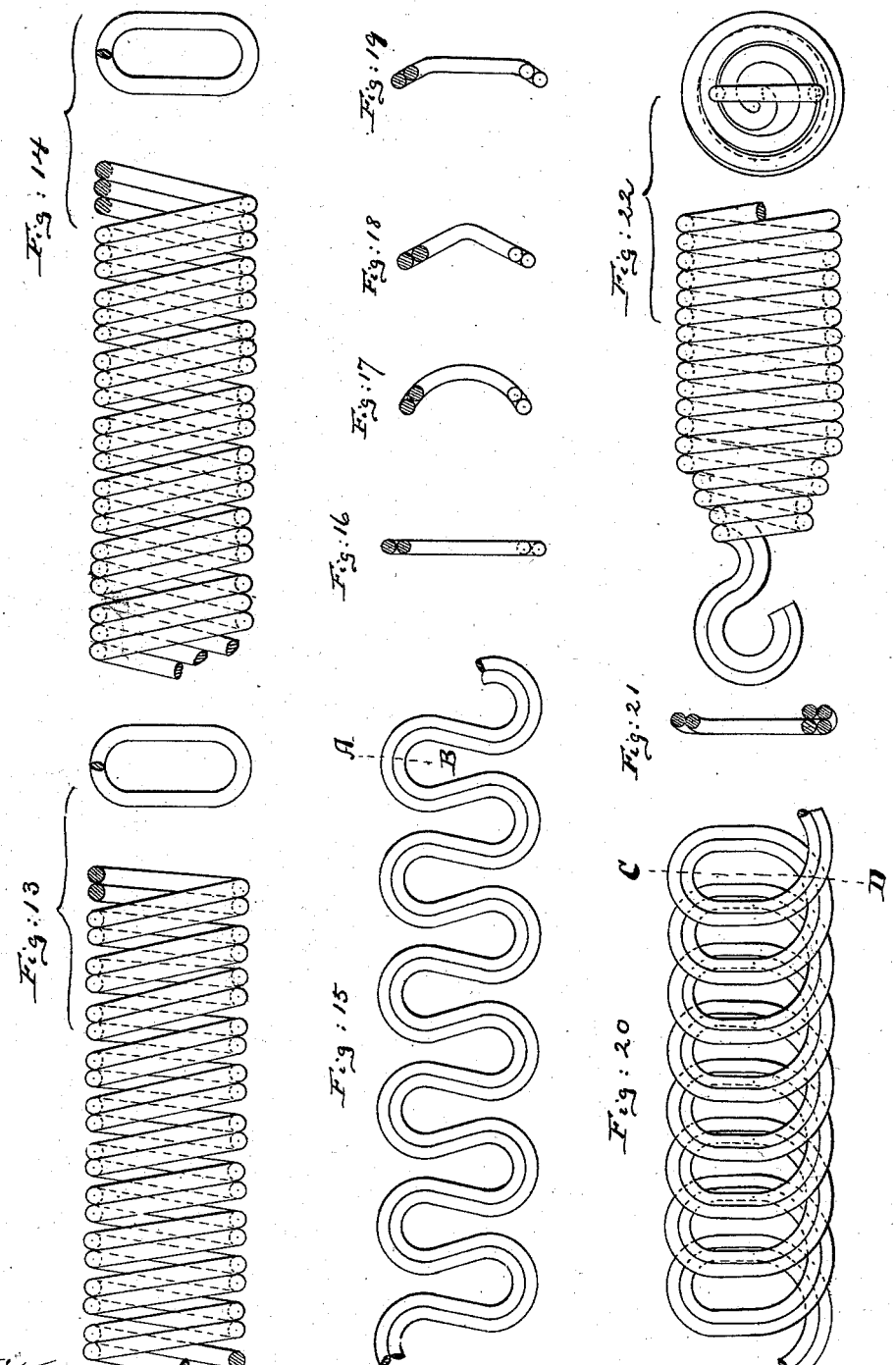

(No Model.) 3 Sheets—Sheet 3.
W. BUCKLEY.
SPRING.
No. 274,715. Patented Mar. 27, 1883.
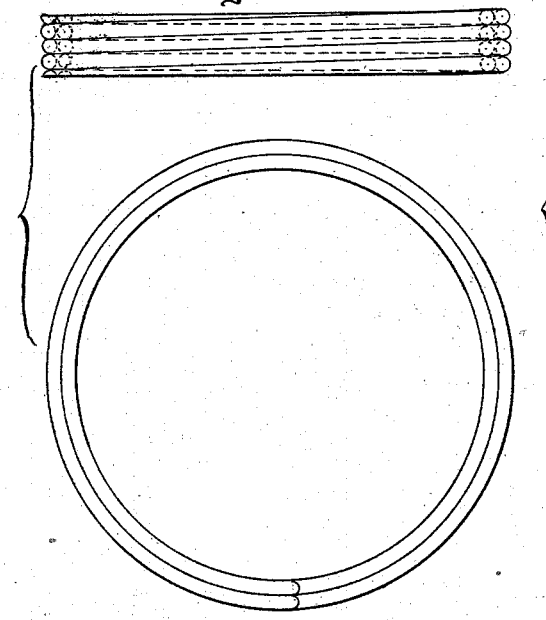
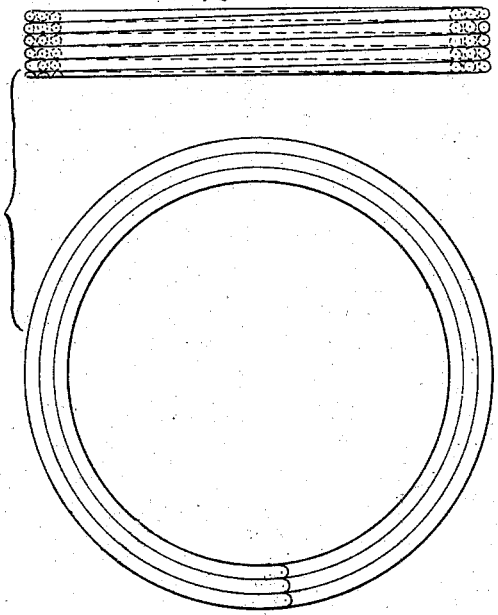
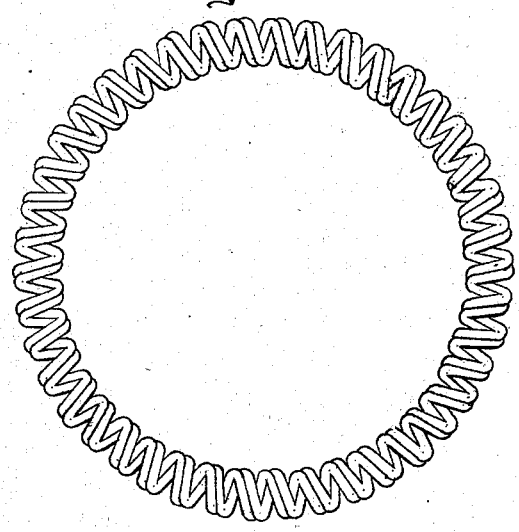
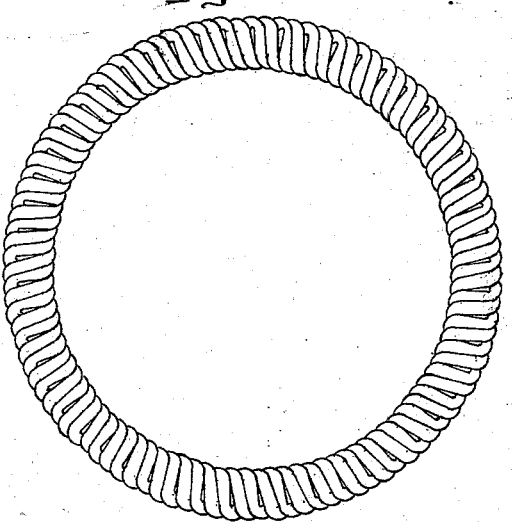
Witnesses
John C. Tunbridge.
John M. Speer
Inventor
William Buckley
by his attorneys
Briesen & Betts

UNITED STATES PATENT OFFICE.

WILLIAM BUCKLEY, OF SHEFFIELD, COUNTY OF YORK, ENGLAND.

SPRING.

SPECIFICATION forming part of Letters Patent No. 274,715, dated March 27, 1883.

Application filed December 7, 1882. (No model.) Patented in England April 21, 1882, No. 1,912.

*To all whom it may concern:*

Be it known that I, WILLIAM BUCKLEY, a subject of the Queen of Great Britain, residing at Sheffield, England, engineer, have invented certain new and useful Improvements in Springs, (for which I have received Letters Patent in Great Britain, No. 1,912, dated April 21, 1882,) of which the following is a specification.

This invention relates to certain improvements in the manufacture of all classes and kinds of springs which are made from wires or rods of steel, brass, or other suitable metallic material by bending, coiling, or otherwise manipulating such wires or rods, the particular object of the invention being the production of springs possessing greater elasticity and durability than any other springs already in use.

In making springs by bending and coiling round a mandrel or bar, or by otherwise manipulating wires or rods of steel, brass, or other material, single wires or rods only have hitherto been used, thereby making single or simple springs only. This invention, however, specially consists in bending, coiling, or otherwise manipulating or manufacturing by machinery two, three, or more wires or rods of metal or other suitable metallic material, and so forming or making double, treble, or compound springs that they will possess greater elasticity and durability, and will be far more reliable and exact in their working than single springs are.

In manufacturing the improved springs I provide, manipulate, and arrange two, three, or more wires or rods of steel, brass, or other suitable metallic material, so as to compose and form any kind of spring that may be required, and being formed (as mentioned) of two, three, or more wires or rods, the spring is compound, instead of being a simple single spring, and it possesses great advantages over the single or simple spring; and as this invention is not confined to any particular kind or class of spring, it will be seen, and must be understood, that the form or shape of the spring, the metallic material from which it is made, the section of the material, the manner of manipulating or manufacturing the same, or the purpose for which the spring is to be used, is not at all material to this invention, the principle and main feature thereof being a compound spring formed and made as above stated; and it should also be understood that my improved spring may be made of steel, brass, or other suitable metallic material, which may be of flat, round, oval, triangular, square, or of any other desired section, and either bent, coiled, overlapped, or otherwise manipulated and arranged so as to produce any desired kind or class of spring, and this compound spring is adaptable to and can be employed for all purposes for which single or simple metallic springs are used.

On reference to the annexed sheets of explanatory drawings it will be seen that various kinds and conformations of springs are shown as some examples and illustrative of the peculiar principle of my invention.

Figures 1, 2, and 3 represent in elevation my single-conical double-lapped springs, being respectively round or circular, oval, and triangular in shape or conformation. Figs. 4, 5, and 6 are plan views of the same. Figs. 7, 8, and 9 show elevations of my double-conical double-lapped springs, and Figs. 10, 11, and 12 are plan views of the same. Fig. 13 (on Sheet 2) represents an oval double-lapped spring, with an end elevation of same; Fig. 14, an oval treble-lapped spring, with an end elevation thereof. Fig. 15 shows a flat zigzag close double-lapped spring in elevation, and Fig. 16 is a section on the line A B of Fig. 15, and Figs. 17, 18, and 19 show sections of the same spring in different forms. Fig. 20 represents in elevation my close double-overlapped spring, and Fig. 21 is a section on the line C D of Fig. 20. Fig. 22 shows a close double-lapped circular spring in elevation, (and plan view,) with a spiral end, to which a hook is secured, and another hook may be attached to the other and similarly-formed spiral end. A sectional end elevation is also shown. At Figs. 23 are shown a plan and an elevation of my double circular spring, and at Figs. 24 are a plan and elevation of my treble circular spring. Fig. 25 represents a circular double spring so formed and arranged as to be capable of expanding, and Fig. 26 is a circular double spring so made and arranged as to be capable of contracting.

It will be seen that in every form of my spring the several rods composing it are substantially parallel to one another, and free also at the ends. These features are essential to good results; hence I disclaim interbraided or intertwisted rods, as are shown in Patent No. 99,475, and rods that are welded together at the ends, as in Patent No. 15,869.

Having described the nature of the said invention and the manner of performing the same, I declare that what I claim is—

The compound spring composed of two or more separate wires or rods placed parallel to each other and disconnected at the ends, substantially as herein shown and described.

WILLIAM BUCKLEY.

Witnesses:
 WM. BLAKE,
 BRISTOW HUNT.